(12) United States Patent
Murphy

(10) Patent No.: US 8,026,918 B1
(45) Date of Patent: Sep. 27, 2011

(54) CONTROLLING COMMUNICATIONS WITH PROXIMATE AVATARS IN VIRTUAL WORLD ENVIRONMENT

(75) Inventor: Stephen Vaughan Murphy, Ashburn, VA (US)

(73) Assignee: AOL Inc., Dulles, VA (US)

( * ) Notice: Subject to any disclaimer, the term of this patent is extended or adjusted under 35 U.S.C. 154(b) by 948 days.

(21) Appl. No.: 11/944,365

(22) Filed: Nov. 21, 2007

Related U.S. Application Data

(60) Provisional application No. 60/867,044, filed on Nov. 22, 2006.

(51) Int. Cl.
*G06T 15/00* (2011.01)
(52) U.S. Cl. ........ 345/473; 345/474; 345/475; 709/206; 709/230; 715/741; 715/753; 715/758
(58) Field of Classification Search .................. 345/473, 345/474, 475; 709/206, 230; 715/741, 753, 715/758
See application file for complete search history.

(56) References Cited

U.S. PATENT DOCUMENTS

| | | | | |
|---|---|---|---|---|
| 7,124,370 B2 * | 10/2006 | Fish | .............................. | 715/741 |
| 7,219,303 B2 * | 5/2007 | Fish | .............................. | 715/753 |
| 7,468,729 B1 * | 12/2008 | Levinson | ........................ | 345/473 |
| 7,484,176 B2 * | 1/2009 | Blattner et al. | ................ | 715/758 |
| 7,636,755 B2 * | 12/2009 | Blattner et al. | ................ | 709/206 |
| 7,783,592 B2 * | 8/2010 | Armstrong et al. | .................... | 1/1 |
| 7,808,131 B2 * | 10/2010 | Hurst et al. | ..................... | 307/150 |
| 7,828,661 B1 * | 11/2010 | Fish et al. | ........................ | 463/42 |
| 7,849,205 B2 * | 12/2010 | Pounds et al. | ................. | 709/230 |

OTHER PUBLICATIONS

"Never Die While Typing Again," VIVOX The Voice of Virtual Worlds, 2 pages, 2007.
"White Paper: Online Games and Virtual Worlds: Service Integration & Operation." VIVOX, Dec. 2007, 23 pages.
McConnell, J. and Sharma, M., "Implementing Voice in Online Games and Virtual Worlds—A Simple Matter of Knowing Who to Call," *IBM Voice changes everything*, Oct. 2007, 10 pages.

* cited by examiner

*Primary Examiner* — Phu Nguyen
(74) *Attorney, Agent, or Firm* — Finnegan, Henderson, Farabow, Garrett & Dunner LLP

(57) ABSTRACT

A first user's avatar in a virtual world environment may be controlled by using a virtual world application enabling access to a virtual world environment within which the first user has an avatar associated with the first user. A virtual world location corresponding to the first avatar is identified. At least one second avatar proximate to the virtual world location is identified. Filtering information is accessed. Profile information related to the second avatar is accessed. Filtering information is compared to the accessed profile information. Based on the comparison results, a metric related to the second avatar is determined. The metric is related to a threshold. It is determined whether relating the metric to the threshold supports enabling communications between the first and second avatars, and if so, communications to be exchanged between the first and second avatars are enabled.

42 Claims, 10 Drawing Sheets

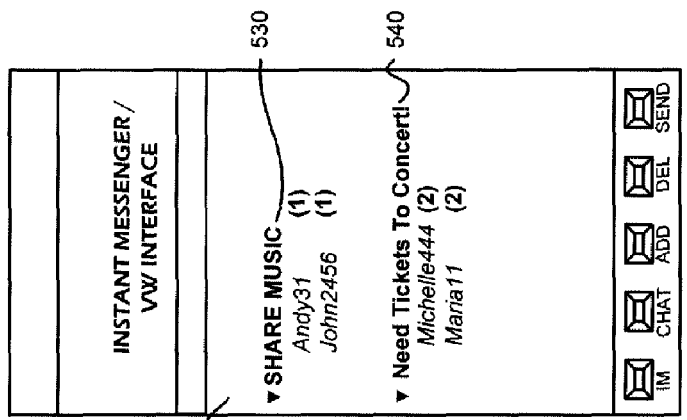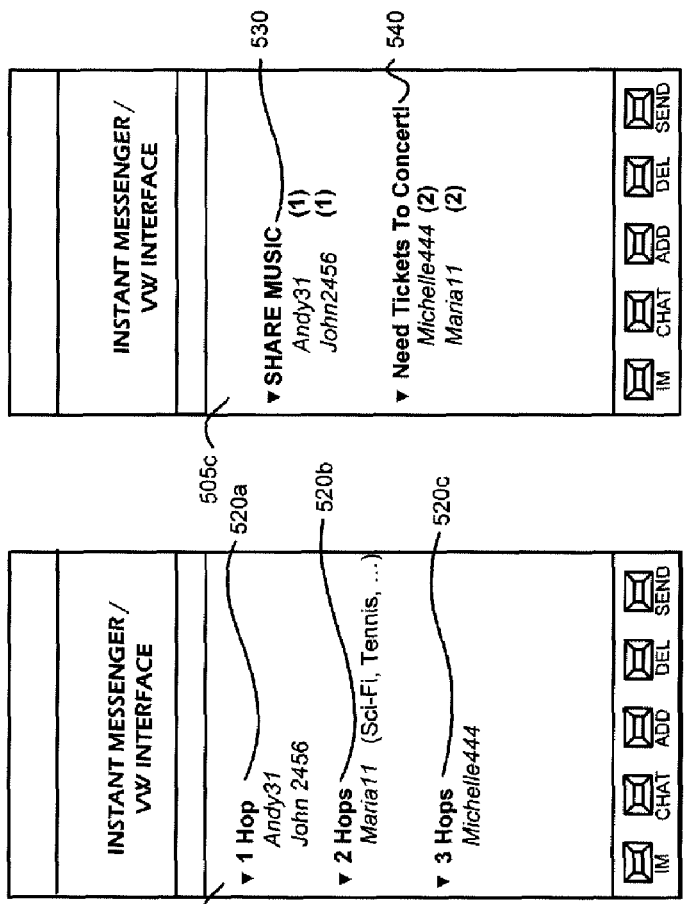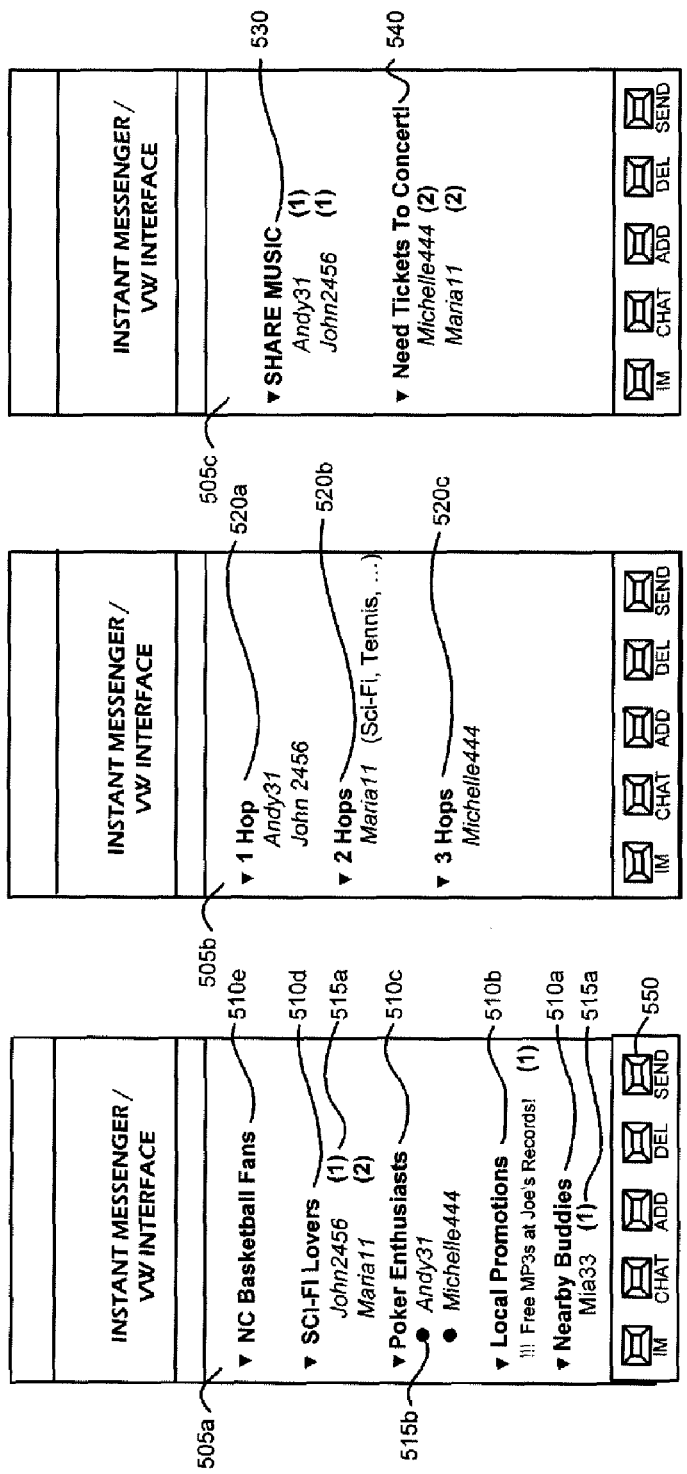

700

| Aggregate Interest Metric | METRIC NAME |
| --- | --- |
| CATEGORY | WEIGHT |
| ▼ Music | |
| ROCK, ALTERNATIVE | +3 |
| COUNTRY | -1 |
| RAP, R&B | 0 |
| ▼ Sports | |
| BOXING, TENNIS | +5 |
| ▼ Hobbies | |
| BASKET WEAVING | -4 |
| ▼ Keyword Search  PATENT | +1 |
| ▼ Number of Hops  >=  3 | +6 |
| ▼ Region/City/Area  TOWN SQUARE | +2 |

FIG. 7

CONTROLLING COMMUNICATIONS WITH PROXIMATE AVATARS IN VIRTUAL WORLD ENVIRONMENT

CROSS REFERENCE

This application claims priority from U.S. Provisional Application No. 60/867,044, filed Nov. 22, 2006, and entitled CONTROLLING COMMUNICATIONS WITH PROXIMATE AVATARS IN VIRTUAL WORLD ENVIRONMENT, which is incorporated by reference.

TECHNICAL FIELD

The document relates generally to a system and method for controlling avatars in a virtual world environment.

BACKGROUND

Users rely on a variety of applications to exchange information with other users.

DESCRIPTION OF FIGURES

FIGS. 5A-5C are exemplary graphical user interfaces for a messaging/virtual world application that indicate proximity information in a virtual world environment.

FIGS. 6-8 are graphical user interfaces that enable a user to specify neighboring avatar search and privacy preferences in a virtual world environment.

Like reference numbers generally represent corresponding parts throughout.

DETAILED DESCRIPTION

Users of virtual world (VW) environment systems, such as "Second Life," operate avatars inside the virtual world environment. In addition, outside of the virtual world environment, VW users may be communicating with users of an instant messaging (IM) system, who are also assigned avatars within the virtual world environment. The avatars of VW/IM users may be proximate to each other in the virtual world environment. As a result, VW/IM users may wish to selectively enable or avoid communications with the proximate avatars based on a variety of criteria.

Figure 1:
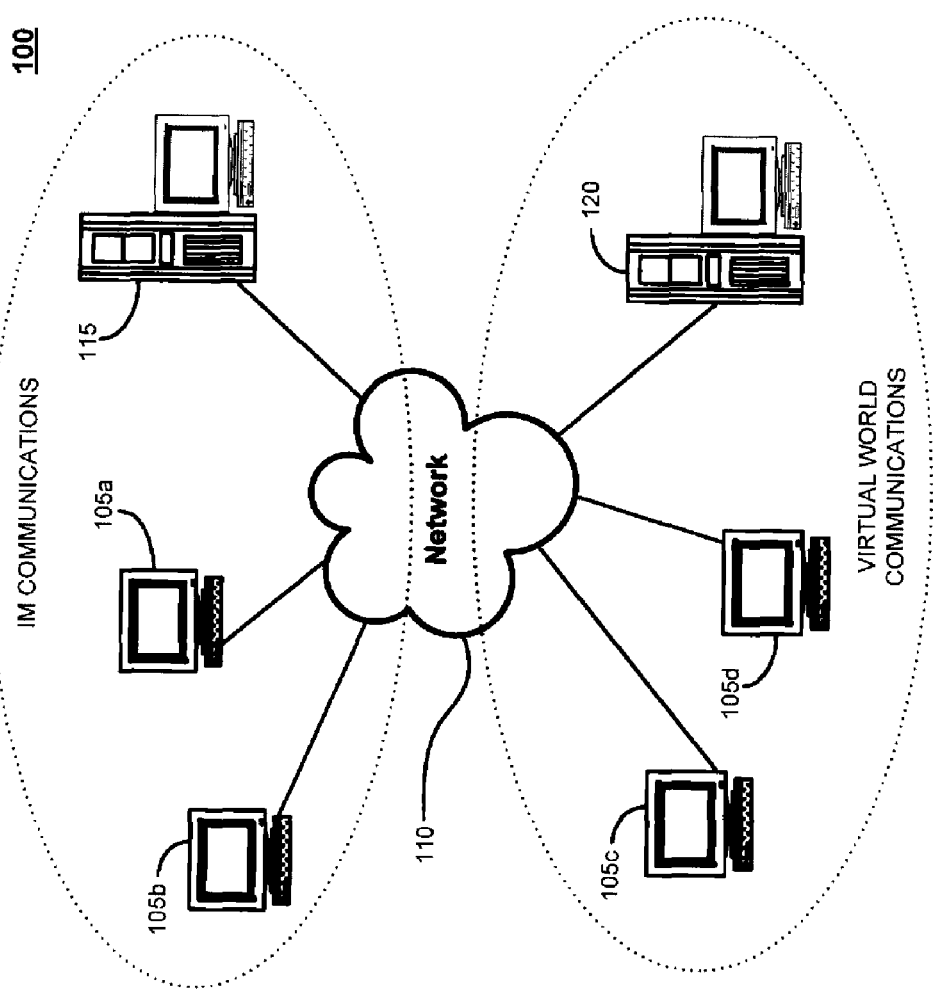
FIG. 1 illustrates an exemplary network computing environment enabling communications between users of instant messaging clients and virtual world clients.

FIG. 1 illustrates an exemplary networked computing environment 100 enabling communications between users of instant messaging (IM) clients and virtual world environments (VWs) clients. Users are distributed geographically and communicate using client systems 105a-105d. For example, users operating client systems 105a and 105b are utilizing instant IM clients to communicate with each other and virtual world environment users 105c-105d. Similarly, users operating client systems 105c-105d are communicating within a virtual world environment and also with users outside of a virtual world environment. A virtual world environment presents an interactive three-dimensional (3D) graphical scene to users 105c-105d, such that users 105c-105d may interact with the world and each other through textual, audio, and/or graphical communications. A network 110 interconnects client systems 105a-105d, which connect to network 110 through various communication mediums, such as a modem connected to a telephone line (using, for example, serial line internet protocol (SLIP) or point-to-point protocol (PPP)) or a direct internetwork connection (using, for example, transmission control protocol/internet protocol (TCP/IP)).

Each of the client systems 105a-105d may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. Client systems 105a-105d may receive instructions from, for example, a software application, a client, a piece of code, a device, a computer, a computer system, or a combination thereof, which independently or collectively direct operations, as described herein. These instructions may take the form of one or more communications clients that facilitate communications between the users of client systems 105a-105d. For instance, such communications clients may include electronic mail (e-mail) clients, IM clients, virtual world environment clients, or voice-over-IP clients. The instructions may be embodied permanently or temporarily in any type of machine, component, equipment, storage medium, or propagated signal that is capable of being delivered to the client systems 105a-105d.

Client systems 105a-105d include a communications interface (not shown) used by the communications clients to send communications through network 110. The communications may include e-mail, audio data, video data, general binary data, or text data (e.g., data encoded in American Standard Code for Information Interchange (ASCII) format).

The network 110 typically includes a communications infrastructure facilitating communications between the different client systems, and may include one or more hosts. Examples of the network 110 include the Internet, Wide Area Networks (WANs), Local Area Networks (LANs), analog or digital wired and wireless telephone networks (e.g., a Public Switched Telephone Network (PSTN)), an Integrated Services Digital Network (ISDN), or a Digital Subscriber Line (xDSL)), or other wired or virtual world environment. The network 110 may include multiple networks or subnetworks, each of which may include, for example, a wired or wireless data pathway.

Computing environment 100 also includes an instant messaging (IM) server 115 and a virtual world (VW) environment server 120 that are connected to network 110. The IM server 115 and the VW server 120 are used to facilitate direct or indirect communications between the client systems 105a-105d. As with the client systems 105a-105d, the IM server 115 and the VW server 120 may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. The IM server 115 and the VW server 120 may receive instructions from, for example, a software application, a client, a piece of code, a device, a computer, a computer system, or a combination thereof, which independently or collectively direct operations, as described herein. These instructions may take the form of one or more communications clients. Such communications clients may include, for example, e-mail clients, VW clients, IM clients, and voice-over-IP clients. The instructions may be embodied permanently or temporarily in any type of machine, component, equipment, storage medium, or propagated signal that is capable of being delivered to the IM server 115 and the VW server 120.

Further, the IM server 115 and the VW server 120 include communications interfaces (not shown) used by the communications clients to exchange communications through network 110. The communications may include different forms of data, such as e-mail data, audio data, video data, general binary data, or text data.

Figure 2:
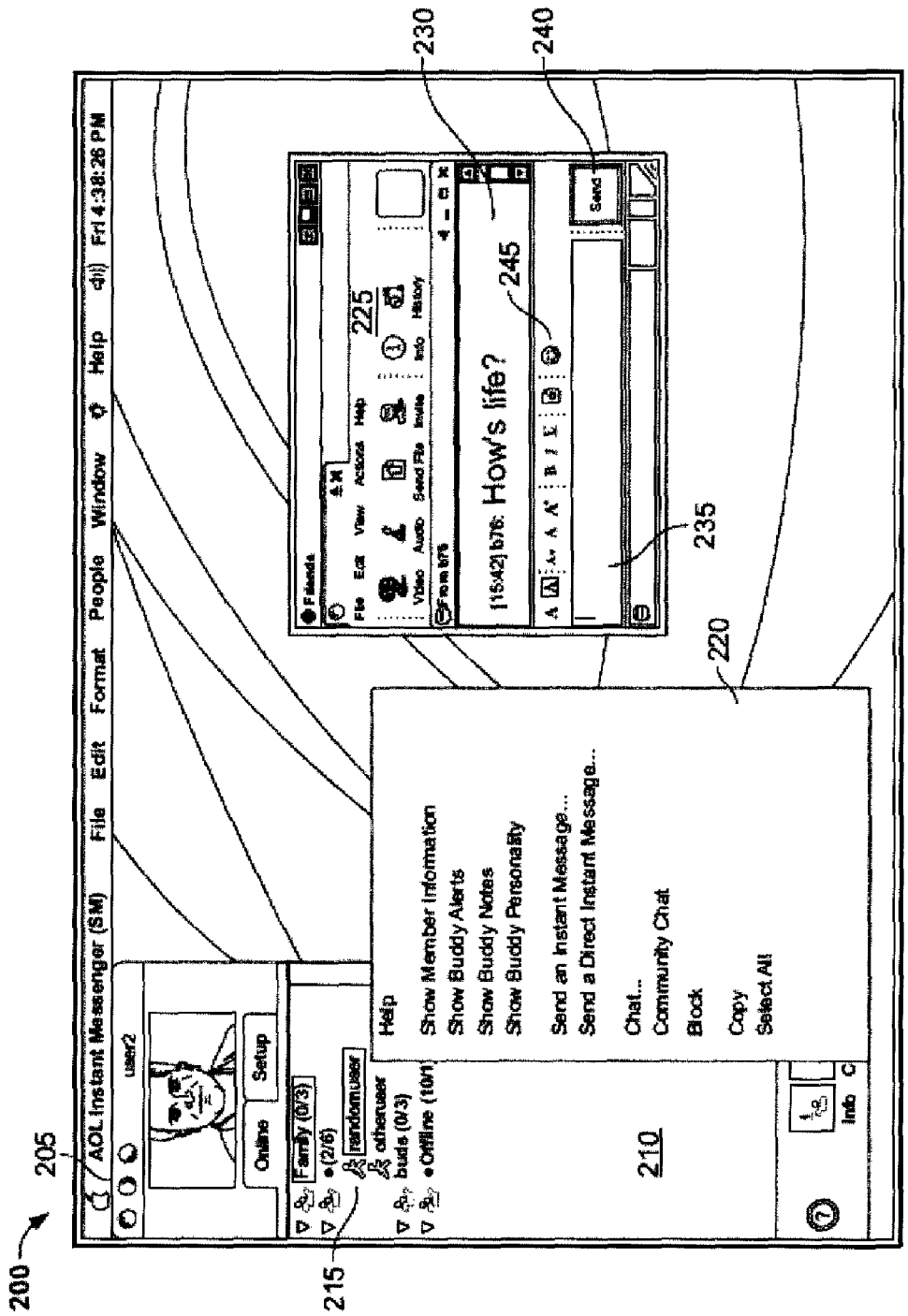
FIG. 2 illustrates an exemplary instant messaging interface presented to a user of an IM client.

FIG. 2 illustrates an exemplary interface 200 presented to a user of one of the client systems, such as the client system 105*a*. The IM client enables a user to communicate in real-time with other users using text and other input. For example, the IM client enables the user to send text communications in an instant message, transfer files, and communicate using voice. Examples of IM clients include those provided by AOL (America Online's AOL Instant Messenger (AIM)), Yahoo Messenger, MSN Messenger, and ICQ.

As shown, a user is presented with an IM user interface 205. User interface 205 includes a text box 210 that displays representations 215 of the user's contacts (e.g., an AIM Buddy appearing in an AIM BuddyList™), which are other users participating in an IM system by executing an IM client on another client system. For instance, in the exemplary interface shown, there are representations for two contacts, "randomuser" and "otheruser." The representations 215 provide status information for the user about the contact, such as whether the contact is online, how long the contact has been online, whether the contact is away, or whether the contact is using a mobile device.

The list of contacts displayed in text box 210 of user interface 205 may be referred to as a list of co-users, and the IM client user may add or remove contacts from the contact list. In the example shown, the representations 215 are rendered as icons showing the screen names of the contacts.

The IM clients may use the IM server 115 to assist in communications between users of the IM clients. The IM server 115 may be configured to interact with a different IM services irrespective of which IM client is being used. The IM server 115 also may support associated services, such as administrative matters, advertising, directory services, chat, and interest groups related to instant messages.

To facilitate the transfer of data, the IM server 115 may implement one or more standard or proprietary IM protocols. The one or more protocols may enable the IM server 115 to facilitate the establishment of a peer-to-peer communication session between the IM client clients, or assist IM communications by directly routing communications between the IM client clients.

To engage in IM communications when using an IM server 115, an IM client on one of client systems 105*a*-105*d* establishes a connection with the IM server 115, authenticating itself in the process. Once the IM client has been authenticated, the IM client indicates whether a particular contact is online, exchange IMs with particular contacts, participate in a group chat room, or trade files, such as pictures, invitations or documents. The user also may be able to find other users with similar interests, get customized information such as news and stock quotes, and search the World Wide Web.

When a contact is online, the user may communicate or interact with the contact in a number of ways. For instance, the user may send an instant message to the contact (typically in the form of text). Sending a message opens up a window 225 in which messages may be typed and viewed as they are communicated back-and-forth between the user and the contact. Window 225 includes a text box 230 and an edit box 235. The sent and received messages of the user are displayed in text box 230. The sender's (i.e., user's or contact's) screen name may be listed beside the sender's corresponding message in text box 230. For instance, in the exemplary window shown, the user (whose screen name is "randomuser") has received a message "How's life?" from the contact (whose screen name is "b76"). To send a reply message, the user types the message in edit box 235 and activates a send command, for example, by pressing an ENTER key or selecting on a Send icon 240. In addition, an emoticon link 235 may be selected from window 225 to display a tool for specifying emoticons that are available when communicating with the contact. Generally, emoticons are two-dimensional images that are sent when certain triggers are included in the text of an instant message, as will be further discusses with respect to FIG. 5. For example, the character sequence ;) may be displayed as a "winking" smiley face. As a result of entering an emoticon, the entered text, along with the emoticons, is displayed in text box 230 within contact's user interface.

Figure 3A:
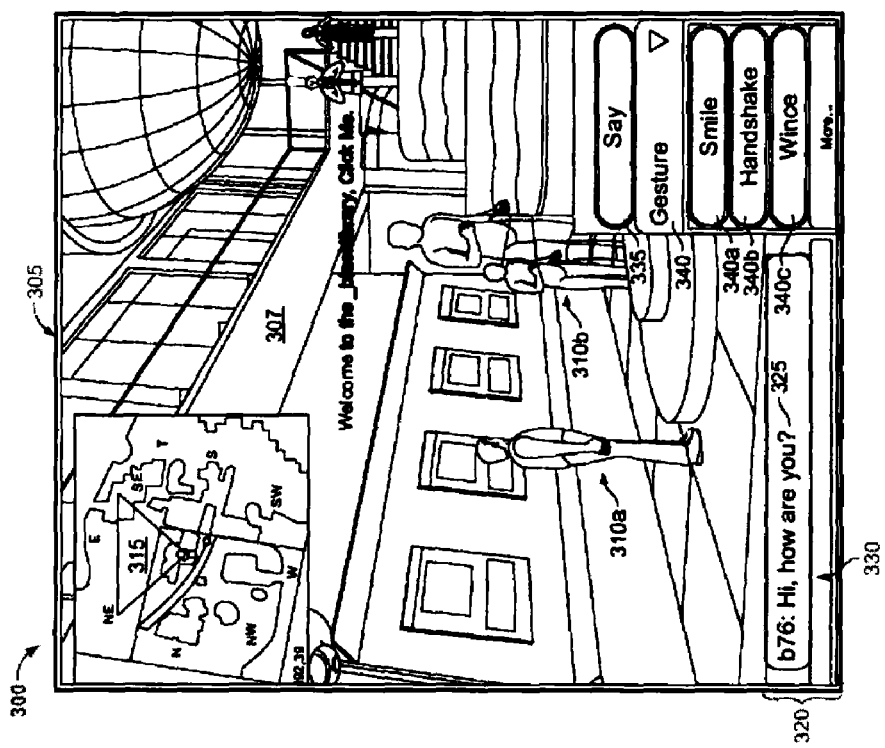
FIGS. 3A and 3B illustrate exemplary virtual world interfaces.
Figure 3B:
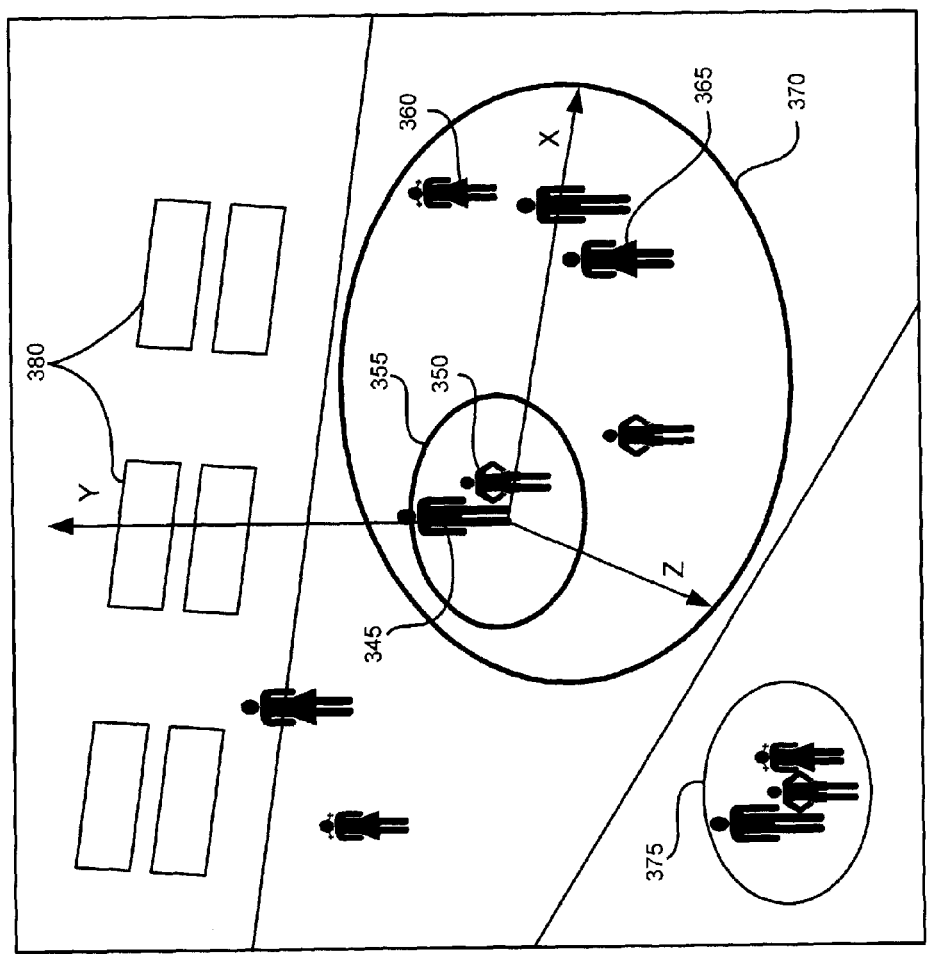

In addition to instant messaging, users of a network computing environment 100 may interact with each other inside a virtual world environment (VW) environment. FIGS. 3A and 3B illustrate exemplary virtual world environment interfaces presented to users of the virtual world environment, such as users 105*c*-105*d* of FIG. 1.

In FIG. 3A, users 105*c*-105*d* may interact in shared, three-dimensional virtual world environment through their respective avatars 310*a*-310*b*, which are graphical representations of users in the virtual world environment system 300. Users 105*c*-105*d* control their avatars through an interface of a VW client 305. For example, the interface 305 enables users to cause their respective avatars 310*a*-310*b* to travel around, gesticulate, or communicate with other avatars within the virtual world environment via text messages, voice, or movements. In addition, VW users may direct their avatars 310*a*-310*b* to interact with the three-dimensional (3D) graphical scene in the virtual world environment by creating, moving, or touching various objects and scene elements. Examples of VW clients include "Second Life" by Linden Research, Inc. and "Virtual Worlds" by Microsoft.

As shown, a virtual world environment system 300*a* presents a user with a VW client interface 305. User interface 305 has a graphical view box 307, which displays the 3D scene of the virtual world environment from a point of view of the user's avatar. In addition, user interface 305 has a high-level, topological map of the virtual world environment 315, which may show users 105*c*-105*d* the current location of their avatar on the overall map of the virtual world environment and also may allow users 105*c*-105*d* to quickly zoom in to the specific locations within the virtual world environment.

VW users 105*c*-105*d* may communicate or interact with the virtual world environment in a number of ways. For instance, the user 105*c* may send a message to the user 105*d* (typically in the form of text). Sending a message is done by typing the message in a messaging window 320. The messages may be perceived as the messages are exchanged. Messaging window 320 includes a text box 325 and an edit box 330. For example, the sent and received messages of the user 105*c* are displayed in text box 325. A user's screen name may be listed beside the avatar's corresponding message in text box 325. For instance, in the exemplary window shown, the user 105*c* has received a message "Hi, how are you?" from the user 105*d* (whose screen name is "b76"). To send a reply message, the user 105*c* types the message in edit box 330 and activates a send command by, for example, pressing an ENTER key.

Users may speak to each other and other users by using voice communications. For example, the user 105*c* may press a "Say" button 335 and begin a voice communications session with the user 105*d*. In addition, users 105*c*-105*d* may cause their avatars 310*a*-310*b* to gesticulate to each other and other avatars by selecting from a variety of gestures from a pull-down menu 340. Selecting a gesture from the pull-down menu 340 causes user's avatar to perform a specific action in the virtual world environment. For example, the user 105*c* may select a "smile" gesture 340*a* from a list of available gestures 340, which will cause user's avatar 310*a* to smile. The number of available gestures or gesture combinations may be quite large. Users 105*c*-105*d* may be able to cause their avatars to express a wide range of emotions, such as happiness, anger, or tiredness, by selecting from a variety of available gestures. For instance, the user 105*c* may cause avatar 310*a* to wince in pain and rub its belly to indicate a stomachache to the user 105*d*. In addition, a user may customize the expressions presented by their avatar. For example, the avatar may modify a profile to configure certain facial configurations to be associated with a specified trigger and/or mood. Alternatively or in addition, the user may specify an intensity of emotion that lies within an intensity spectrum. For example, a user may interact with a control mechanism numbered from 0 until 1000, where 0 represents a neutral mood, 100 represents a perturbed mood, 200 represents being upset, up until a value of 1000 (representing extreme anger). Each of the numbers may represent a setting for a facial expression (e.g., an intensity of a facial expression such as a furrowed brow). In the case where the furrowed brow reflects the mood, a first "range of motion" to a first position may represent progressive moods from 0-100 while a second "range of motion" may represent more extreme moods to a second position.

In yet another example, users 105*c*-105*d* may control their avatars through the use of video with face/gesture tracking software. For example, users 105*c*-105*d* may configure a desktop video camera to track user actions and expressions in the real world and translate these actions to the avatar actions in the virtual world environment. Thus, for example, when the user 105*c* smiles and waives his hand in front of the webcam, the face/gesture tracking software will detect these actions of the user 105*c* and cause his avatar to smile and waive a hand in the virtual world environment.

The VW clients may use a virtual world environment server 120 to assist in communications between users of the VW clients. The VW server 120 may support VW services irrespective of a client user's network or Internet access. Thus, for example, VW server 120 may allow users to communicate with other users, regardless of whether they have access to any particular Internet service provider (ISP). The VW server 120 also may support associated services, such as billing, administrative matters, advertising, and directory services related to the virtual world environment.

To facilitate the transfer of data, the VW server 120 may employ one or more standard or proprietary VW communication protocols. The one or more protocols may enable the VW server 120 to facilitate the establishment of a peer-to-peer communication session between the VW client clients, or assist VW communications by directly routing communications between the VW client clients.

To engage in VW communications when using the VW server 120, a VW client running on one of client systems 105*c*-105*d* establishes a connection with the VW server 120 and authenticates. Once authenticated, VW users 105*c*-105*d* may use the VW client to create or modify their avatars 310*a*-310*b*, communicate with other VW users through avatars 310*a*-310*b*, or interact with the environment of the virtual world environment through avatars 310*a*-310*b*. For example, the user 105*c* may build a "virtual" object, such as a house, and rent this house to the user 105*d* for a fee. Then, the avatar 310*b* of the VW user 105*d* is able to inhabit the newly-built house and interact with the objects stored in the house.

VW users 105*c*-105*d* may communicate with the users outside of the virtual world environment, such as IM users 105*a*-105*b*. This communications may be accomplished by sending instant messages between VW users 105*c*-105*d* and IM users 105*a*-105*b*. Such communications may be either unidirectional or bidirectional—that is, VW users may send messages to IM users and/or IM users may send messages to VW users. Alternatively or in addition, such communications may include email, instant messages, voice communications, chat communications, voice-over-IP, or other communications.

FIG. 3B illustrates another exemplary virtual world environment 300*b*. Avatars 345, 350, 365, and 375, represent users in a virtual world environment 300*b*. Avatars 345, 350, 365, and 375 are spatially distributed in the virtual world environment 300*b* and their respective locations may be expressed as a set of coordinates in the virtual world environment 300*b*. A location of an avatar or other objects in the virtual world environment 300*b* may be expressed as a set of coordinates in a cartesian coordinate system (e.g., x,y,z), geographic coordinate system (e.g., latitude, longitude), or other coordinate system that is utilized by the virtual world environment 300*b*. For example, the avatar 345 is placed at a location in the virtual world environment that may be identified by the (x,y,z) coordinates, as well as other information related to the virtual world environment 300*b*, such as a city, a country, or a region.

A location in the virtual world environment 300*b* may be identified by a location identifier. The location identifier may be encoded in a text string, such as a uniform resource locator ("URL"). Specifically, the location identifier may include the location's coordinates, as well as other information helpful for identifying a location. For example, the location identifier may include (x,y,z) coordinates of a location and a city/region/country name. The location identifier also may include other information, such as the location's commonly-used nickname. For example, the location identifier may include a nickname, such as "Red square" or "Joe's Music Store". Because the location identifier is encoded in a text string, it may be included as part of an electronic invitation to visit a specific location. For example, a first user, such as the VW user 105*c*, may transmit an electronic invitation to the IM user 105*a* to visit a location in the virtual world environment 300*b*. The transmitted electronic invitation may include a location identifier specifying a location in the virtual world environment 300*b*. By accessing the electronic invitation, the second user may be enabled to enter the location in the virtual world environment 300*b*. The electronic invitation may be sent in an instant message or an email. In case the IM user 105*b* is not a subscriber to the virtual world environment 300*b*, the IM user 105*b* may be prompted to subscribe to the virtual world environment 300*b*.

Referring back to FIG. 3B, the user's avatar 345 is proximate to neighboring avatars 350, 360, 365, and 375. Consequently, the user's avatar 345 may assign interest metrics to neighboring avatars. The neighboring avatar's interest metrics may be used to indicate whether the user's avatar 345 should enable or avoid communications with the neighboring avatars. In general, the user's avatar 345 may enable communications with neighboring avatars that have higher interest metrics and avoid enabling communications with neighboring avatars with lower interest metrics. The determination of enabling communications may be performed by comparing an interest metric to a threshold. For example, if the interest metric for a neighboring avatar is greater or equal to the threshold, then the user's avatar 345 enables communications with that neighbor device. On the other hand, if the interest metric for the neighboring avatar is smaller than the threshold, then the user's avatar 345 disables communications with that neighboring avatar.

The interest metric may be based in part on a topology of the virtual world environment 300b. For example, some avatars neighboring the user's avatar 345 may be topologically more proximate to the user's avatar 345 than others. The proximity between avatars may be determined based on their respective coordinates in the virtual world environment 300b. From the perspective of user's avatar 345, the interest metrics of other user's avatars may be determined using proximity indicators, such as a distance to the neighboring avatar or a number of hops to the neighboring avatar.

If the virtual world environment 300b is using a Cartesian coordinate system to represent locations, the distance D between two avatars with respective locations (x1,y1,z1) and (x2, y2, z2) may be found as:

$$D=\sqrt{(x2-x1)^2+(y2-y1)^2+(z2-z1)^2}$$

In case the virtual world environment is using other coordinate systems, distances between respective locations may be found using proximity calculations for those coordinate systems.

In addition, the proximity may be represented in terms of hops of predetermined lengths. Thus, if the distance from the avatar 345 to the avatar 370 is 10 units and the hop length is 5 units, then the avatar 345 is 2 hops away from the avatar 370. Having an ability to adjust the hop length provides the user of the virtual world environment 300b with a convenient way of measuring distance. For example, if a hop length is set to a length of one avatar step, then the user may measure a distance from her avatar to other locations in terms of steps. As shown in FIG. 3, the neighboring avatar 350 is located within a single hop of the user's avatar 345, as also indicated by the circle 355. Similarly, neighboring avatars 360, and 365 are located within a two-hop radius of the user's avatar 345, since they are separated from the user's avatar 345 by two hops, as also indicated by the circle 370. Other avatars, such as a group of avatars 375, are outside the two-hop radius.

The user's avatar 345 may be configured to selectively enable communications with the neighboring avatars within a specified N-hop radius. The communications may be voice, video, textual or paralinguistic communications, such as gestures. For example, the user may elect to only communicate with neighbors who are within one hop of the user's avatar 345, such as the avatar 350. Additionally or alternatively, the user may elect to only communicate with neighbors who are within a specific radius of the user's avatar 345 or within a specific distance from a user-provided location, such as a town hall, shopping mall, or a location specified by a set of coordinates. Additionally or alternatively, the user may choose to record conversations of other avatars within a specified radius, if privacy settings of other avatars permit the user to do so. Thus, the user's avatar 345 may communicate with the neighboring avatar 350 and, at the same time, record a conversation taking place in the avatar group 375. After the user is finished communicating with another user represented by the avatar 350, the user may playback the recorded conversation or read through the transcript of the recorded conversation. The user may have to obtain consent from other users before recording their conversations. The act of giving such consent also may be recorded.

The interest metric also may be based on factors other than proximity, such as characteristics of the neighboring avatars. For example, neighboring avatar's characteristics may include neighbor types, such as "business," "individual," or "advertiser." In addition, neighbor types may be further subdivided or categorized into sub-types by a variety of characteristics. In one example, the neighbor type "virtual store" may be sub-divided into multiple sub-groups, such as "apparel," "avatar design," "virtual estate," "gizmos," "music," and others. In another example, the neighbor characteristics depend on the content advertised by the neighbor, such as the specific value of store discounts. In addition, the neighbor characteristics may indicate a neighbor's interests or social activities, such as interests in poker, science fiction, or kung-fu movies. The user may assign different interest metrics to different neighbor characteristics. Hence, the user may set the interest metrics to the highest value for the individuals interested in poker, the medium value for the stores advertising free music or virtual apparel, and the smallest value for stores advertising discounts on virtual apparel that are less than 20% off. As a result, the user's avatar 345 may prevent communications with the stores advertising discounts on virtual apparel, because these stores' have interest metrics that are too low for the user.

Enabling communications based at least in part on proximity also may assist businesses in identifying potential customers. In one example, the owner of an online music store may only want to advertise a "7:30 special" to the customers who are close-by to the store to avoid advertising to customers who are too far away to take advantage of the "7:30 special," such as free MP3 music. In another example, a virtual department store with a large number of diverse products may tailor its promotional advertisements to the customers shopping within specific store sections. Hence, customers shopping in a "Women's Apparel" section may receive advertisements that are different from advertisements received by customers shopping in a "Men's Apparel" section.

Furthermore, an interest metric for an avatar may be an aggregate interest metric. Thus, an interest metric may include sub-categories, with individual weights assigned to different sub-categories within an aggregate interest metric. In one example, the aggregate metric may then be computed for an avatar by adding the weights of the individual sub-categories. The individual weights may be manually assigned by a user or may be assigned with a help of an "assignment" wizard that determines user's preferences. The aggregate interest metric may include various sub-categories, such as interests, user types, advertisement content, proximity, or other user-specified categories. For example, a first user assigns a weight of "+5" to "music/rock", a weight of "−3" to "music/country", a weight of "+1" to "sports/hockey," and a weigh of "+2" to any avatar that is within a 2 hop radius. When the avatar of the first user is approached by an avatar of another user who likes country music and is within 2 hop radius, the avatar of the second user will be assigned an aggregate interest metric of −1 (−3 for music+2 for proximity). Finally, a user also may be enabled to create/save multiple aggregate interest metrics. By applying different aggregate metrics to a group of proximate avatars, the user may quickly identify the proximate avatars with whom communications should be enabled or avoided.

Additionally or alternatively, a graphical indication may be utilized to help the user identify the proximate avatars with whom communications should be enabled or avoided. The interest metric may be automatically calculated for the proximate avatars. The proximate avatars may then be visually distinguished based on the interest metric. For example, avatars with high interest metrics may be colored or highlighted in green, avatars with medium interest metrics may be highlighted in yellow, and avatars with low interest metrics may be highlighted in red. In another example, an interest metric score may be displayed above or next to the proximate avatars. In yet another example, graphical icons indicating degrees of interest, such as exclamation marks or rays, may be displayed above or next to the proximate avatars. Other graphical representations of interest metrics may be available.

Figure 4:
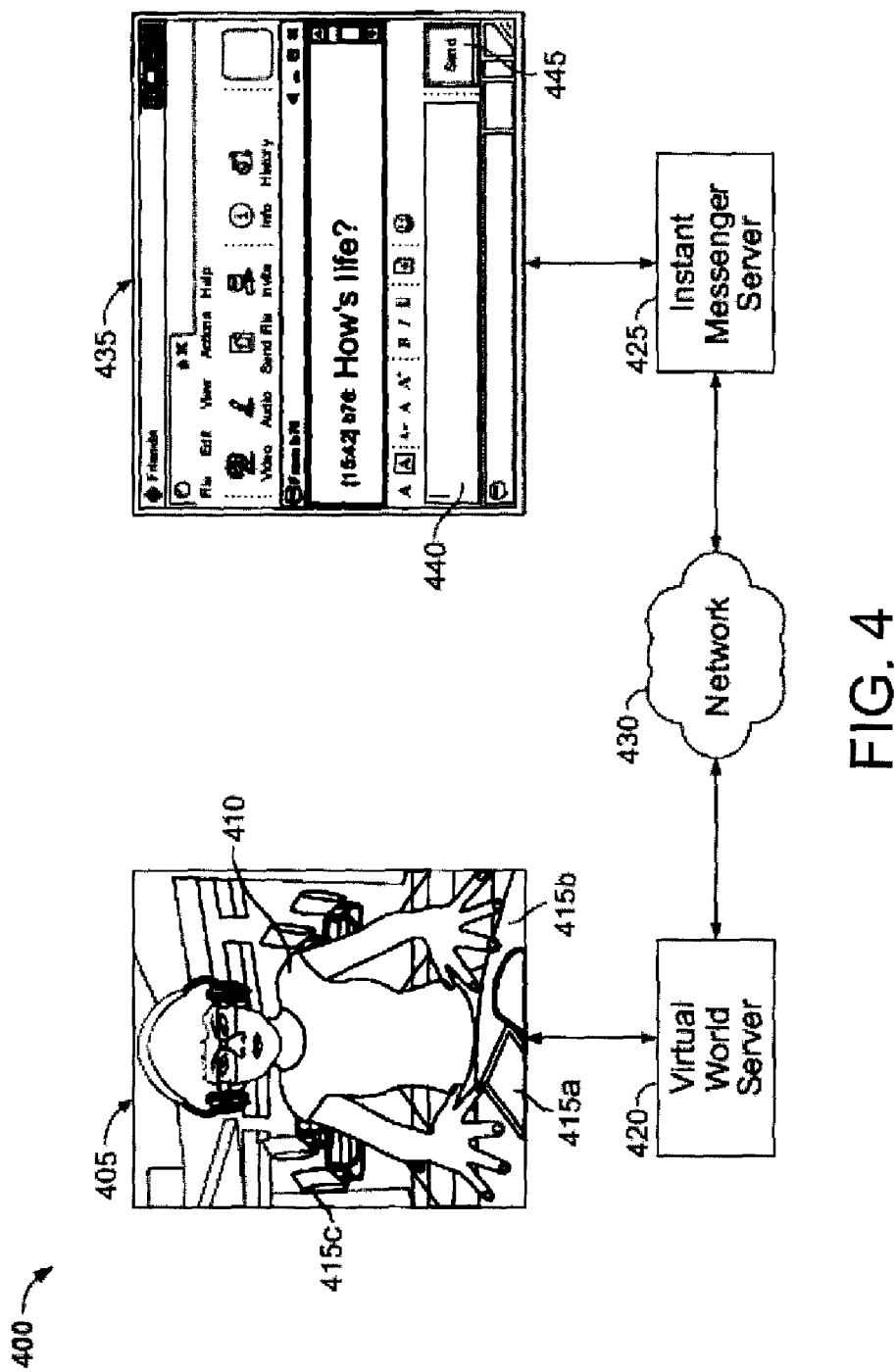
FIG. 4 illustrates communications between an instant messaging system and a virtual world system.

FIG. 4 illustrates communications between an IM system 200 and a virtual world environment system 300. The VW user 105c may interact with the virtual world environment through a user interface of the VW client 405, which is similar to the previously discussed interface 305. The user 105c is represented in the virtual world environment by her avatar 410. As described with respect to FIG. 3, actions of the avatar 410 are controlled by the user 105c through the interface of the VW client 405. Here, for example, user 105c has directed her avatar 410 to read a book in a virtual library. Hence, avatar 410 is surrounded by a rich graphical environment representative, which includes books 415a, tables 415b, and chairs 415c. Avatar 410 may interact with any of these and other virtual objects.

The user 105c may wish to communicate with the IM user 105a. In this case, she sends a message from the VW interface 405 to the IM client of the IM user 105a. For instance, in the exemplary window shown, the VW user 105c (whose screen name is "b76") has sent a message "How is life?" to the IM user 105a. The sent message passes from the VW server 420 to the IM server 425 by way of the network 430, all of which have been described previously with respect to FIG. 1. The message is displayed to the IM user 105a through an interface of the IM client 435, which has also been described previously with respect to FIG. 1. To send a reply message to the VW user 105c, the IM user 105a may type the message in edit box 440 and press an ENTER key or click on a Send icon 445.

FIGS. 5A-5C show exemplary graphical user interfaces for a messaging or a virtual world environment application that indicates proximity information in a virtual world environment. Specifically, IM system 200 may organize users based on various interest metrics. The identities appearing in the co-user list 505 may be separated into one or more groups based on various interest metrics, such as proximity to the user's avatar or neighboring avatar characteristics.

For example, the co-user list 505a in the participant list interface 500A includes a "Nearby Buddies" group 510a, a "Local Promotions" group 510b, a "Poker Enthusiasts" group 510c, a "Sci-Fi Lovers" group 510d, and a "NC Basketball Fans" group 510e. The identities are organized in groups based on interest metrics, activity interests, and/or other characteristics. For example, the identities appearing in the "Nearby Buddies" group 510a may be identified in response to a determination that of whether an avatar associated with an identity is located within a predetermined threshold, as evidenced by the proximity indicator icon 515a. On the other hand, the identities in "Sci-Fi Lovers" group 510d share an interest in science fiction, as indicated in an online profile.

In addition, some groups may be generated by virtue of a business interest. For example, a group selection protocol may distinguish between business users and consumers. The "Local Promotions" group 510b includes business identities, advertisements, and/or promotions from business entities in the virtual world environment. For example, a virtual music store "Joe's Records" may solicit the nearby avatars in a virtual world environment by transmitting information related to current promotions, such as a free MP3 music with some additional purchase (510b).

A proximity indicator 515a may include a graphical or alphanumerical representation of a neighboring avatar's proximity to the user's avatar. For example, the proximity indicator 515a may show the number of hops from the user's avatar to a neighboring avatar. Additionally or alternatively, the proximity indicator 515b may use color or another graphical representation to indicate a relative distance to a neighboring avatar, as illustrated by a circular proximity indicator 515b. For example, a green circle indicator 515b may indicate a nearby neighboring avatar, while a red circle indicator 515b may indicate a distant neighboring avatar.

In another implementation, as shown in FIG. 5B, a participant list interface 500b may include a co-user list 505b that is organized based on proximity to neighboring avatars. For example, neighboring avatars within one hop of the user may be listed in "1 Hop" group 520a, while neighboring avatars within two hops of the user may be listed in "2 Hop" group 520b. Such organization of the network neighboring avatars may enable the user to quickly determine the closest neighboring avatars in the virtual world environment.

In yet another implementation, as shown with respect to the participant list interface 500c of FIG. 5C, in addition to proximity, the identities appearing in the co-user list 505C may be further organized based on an advertised interest/social activity. For example, users may organize themselves into activity groups by broadcasting a desire to engage in a specific social activity, such as media sharing, playing sports, or going to a virtual concert or a meeting. By enabling a user to specify a social activity, a user may walk into a book store and search for other users with avatars who wish to play a pick-up game of softball at a nearby virtual park. In another example, GUI 500c includes a "SHARE MEDIA" group 530 having members who are users with proximate avatars looking to share media, such as music or videos. GUI 500c also includes a "Need Tickets to Concert!" group 540 that is made up of users wishing to purchase tickets to a specific music concert taking place in the virtual world environment.

Each of GUIs 500A-500C also may include a setup button 550 that may be selected to enroll in or start a group. In one implementation, selecting the setup button 550 displays an interface for specifying neighboring avatar selection settings (e.g., neighboring avatar selection privacy settings shown in FIG. 8).

Figure 6:
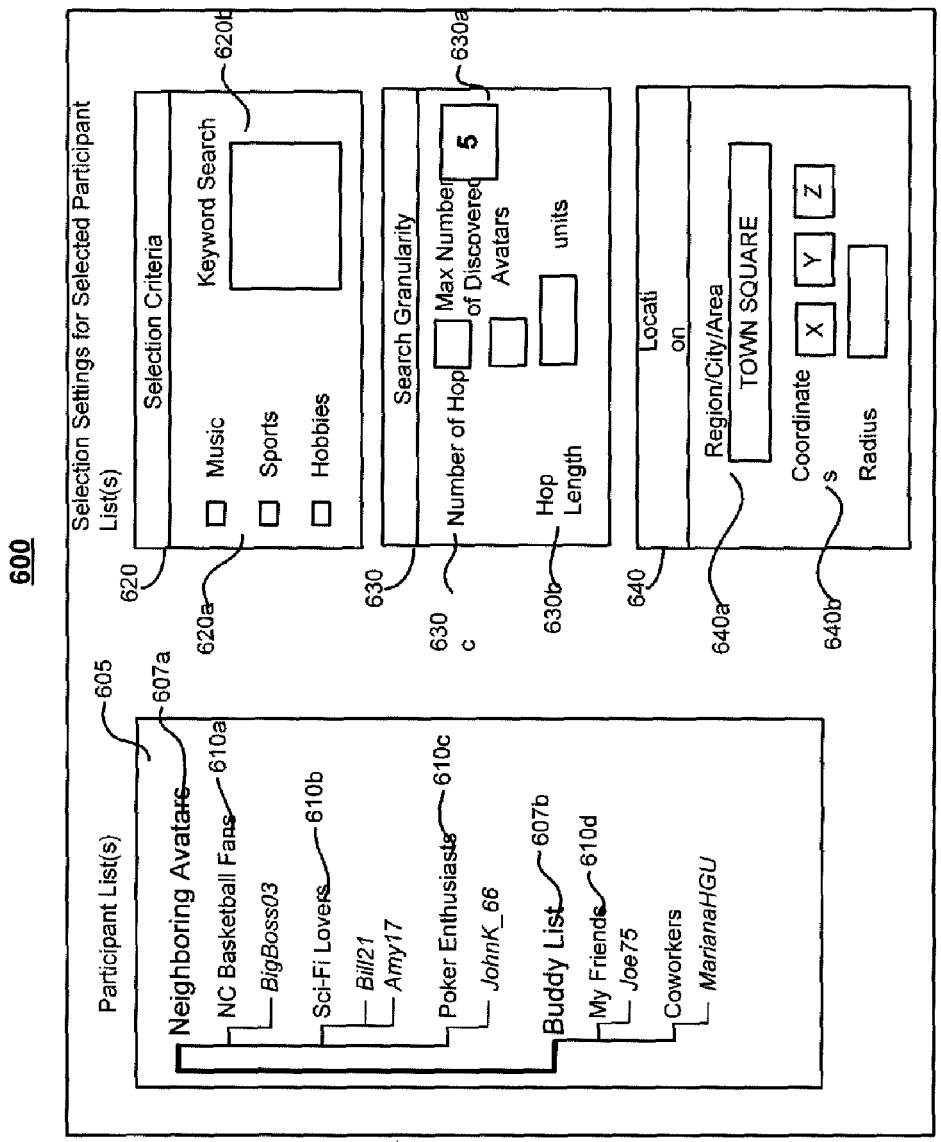

FIG. 6 shows a graphical user interface 600 that enables a user to specify neighboring avatar search settings in a virtual world environment. A user may interact with GUI 600 to specify interest metrics, which in turn, place neighboring avatars into a specific coverage list and/or group. GUI 600 may be used to control how a user interacts with instant messaging system 130, and may be rendered, for example, on the client systems 105a-105d or the IM/VW servers 115 and 120 described previously with respect to FIG. 1. The settings rendered in GUI 600 may be locally stored or stored online (e.g., on IM server 115 or on VW server 120 in FIG. 1).

GUI 600 includes a co-user list window 605 of identities managed by the user. A co-user list may be configured to include identities of people with whom the user exchanges communications and/or identities associated with neighboring avatars in a virtual world environment. A co-user list or group may be generated or populated dynamically (e.g., based on identification of other users with similar interests (607a)), and/or statically, based on pre-defined co-user lists from the messaging system (607b). Interest metrics for listing and grouping identities may include proximity, social activities, and/or other information available from another user's profile. For example, co-user list window 605 includes groups 607a and 607b. The "Neighboring avatars" group 607a is associated with avatars of neighboring avatars having similar interests, such as those included on a "North Carolina basketball fans" list 610a, a "Science Fiction Lovers" list 610b, and a "Poker Enthusiasts" list 610c.

In some implementations, the GUI 600 includes a neighboring avatar selection criteria window 620. The user may select from one of the pre-determined interests in neighboring avatar selection section 620a, and may limit a discovery process to other users sharing the specified types of interests. For example, a user may choose "90's rock music" as one of the required categories in the window 620. As a result of this selection, only the neighboring avatars who have specified that they listen to "90's rock music" are presented to the user in response to the discovery of other avatars. In yet another implementation, a user specifies a set of keywords in a keyword specification section 620b to ensure that the specified keywords are used during searches for neighboring avatars with similar interests. Using keywords may enable a user to perform a more detailed search in identifying other users or their avatars. In one implementation, the keyword specification section 620b enables the user to specify the search terms using regular or Boolean expressions to improve the utility of the search.

GUI 600 includes a search granularity specification window 630. A user may configure options in the search granularity specification window 630 to specify the proximity-specific attributes. For example, the user may attempt to avoid overpopulating a list or a group by setting the limit on the number of per-list/group neighboring avatars using a "maximum number of discovered avatars" setting section 630a. In one specific example, as shown in FIG. 6, the user may specify a maximum limit to be at most five North Carolina fans at a time. In addition, the user may limit the discovery process for other avatars by specifying that only neighboring avatars within a certain N-hop radius be included in the co-user list section 605 (630b). The hop lengths may be specified in coordinates used in the virtual world environment (630c). In another implementation, the user may specify a distance that is used as an indication of proximity. The avatar may be configured to relate the specified distance to proximity using the coordinates used in the virtual world environment to quantify the specified distance according to proximity metrics.

Still, in other implementations, GUI 600 specifies a virtual world environment location that is used during the process of neighboring avatar search and discovery. As shown in GUI 600, a location window 640 enables the user to enter a desired region, city, or area in the virtual world environment so that neighboring avatar discovery in the virtual world environment is responsive to a specified location. In another example, a user may specify a location in the virtual world environment using specific coordinates (e.g., x, y, z) or specify a discovery area using a radius from the specified coordinates (640a).

In yet another implementation, the co-user list represents mixed types of users. For example, a user's instant messaging account may include the participant list 610d from an instant messaging system and a participant list 610a based on virtual world environment topology.

In still another implementation, an avatar may only display a limited number of entries in a co-user list (e.g., a buddy list with screen names) where a larger number of identities are available. In selecting a subset of identities to display, the co-user list may be configured to select identities based on virtual world environment topology information. For example, user's IM or VW application may be configured to display the closest X number of avatars where X represents a number of entries that may be displayed. Alternatively, a user may prefer a degree of anonymity and being further away from other users with whom the user is exchanging communications. As a result, user's IM or VW application may be configured to display (1) identities associated with other avatars that are between X and Y hops away or (2) identities that are at least Z hops away. In yet another implementation, the avatar may be configured to display a list of close friends at all times in a first group of identities, and to display the closest N avatars in a second group of identities.

FIG. 7 shows a graphical user interface 700 that enables a user to specify an aggregate interest metric. The GUI 700 includes a sub-category column 705 that lists sub-categories comprising an aggregate user metric. In addition, the GUI 700 includes a weight column 710 that specifies weights for individual sub-categories. The weights for sub-categories may be manually assigned by the user, assigned with a help of an "assignment" wizard that determines user's preferences, or automatically pre-determined based on user's on-line profile.

The user also may be enabled to create/save multiple aggregate interest metrics. The aggregate metrics may be assigned names to distinguish them from each other (730). Thus, the user may create an aggregate metric "Football/Baseball Junkie" that will emphasize the user's interests in particular sports by assigning high weights to specific sports sub-categories. In another example, the user may create an aggregate metric "Boring People," which will assign negative weights to sub-categories having low appeal to the user. As a result, by applying different aggregate metrics to a group of proximate avatars, the user may quickly identify the proximate avatars with whom communications should be enabled or, alternatively, avoided.

In general, it will be understood that filtering/search settings of FIGS. 6-7 may be based on a variety of criteria related to the user of the virtual world environment. For example, the settings of FIGS. 6-7 may be based on the profile of the avatar of the user in the virtual world environment. In another example, the settings of FIGS. 6-7 may be based on the profile(s) of the user outside of the virtual world environment. This external profile(s) of the user do not have to be the same as the profile of the user's avatar and may contain different information and settings. For example, the user may maintain an alter-ego profile for her avatar in the virtual world environment that is different from the user's profile outside of the virtual world environment. Furthermore, the settings in FIGS. 6-7 may be directly specified by the user and do not have to bear any relationship to the user's external profile(s) or the profile of the user's avatar in the virtual world environment.

Additionally or alternatively, the settings of FIGS. 6-7 may be automatically extracted from the information stored in the profile of the user's avatar or the external profile of the user. In one example, the user maintains two distinct profiles—one for his avatar in the virtual world environment and one for his online service provider (e.g., America Online). The user's external profile at the online service provider includes information related to user's interests and preferences. For example, the external profile indicates that among other things, the user is interested in poker and dislikes chess. In addition, the other profile of the user's avatar in the virtual world environment indicates that the avatar is interested in communicating with other avatars from Japan. These exemplary interests (i.e., poker and/or Japan) and dislikes (chess) may be automatically extracted from the aforementioned profiles and used as filtering/search settings in FIGS. 6-7. Furthermore, the user may add any additional filtering/search settings directly using the exemplary interfaces described in FIGS. 6-7 without relying on the information stored in the profiles.

Figure 8:
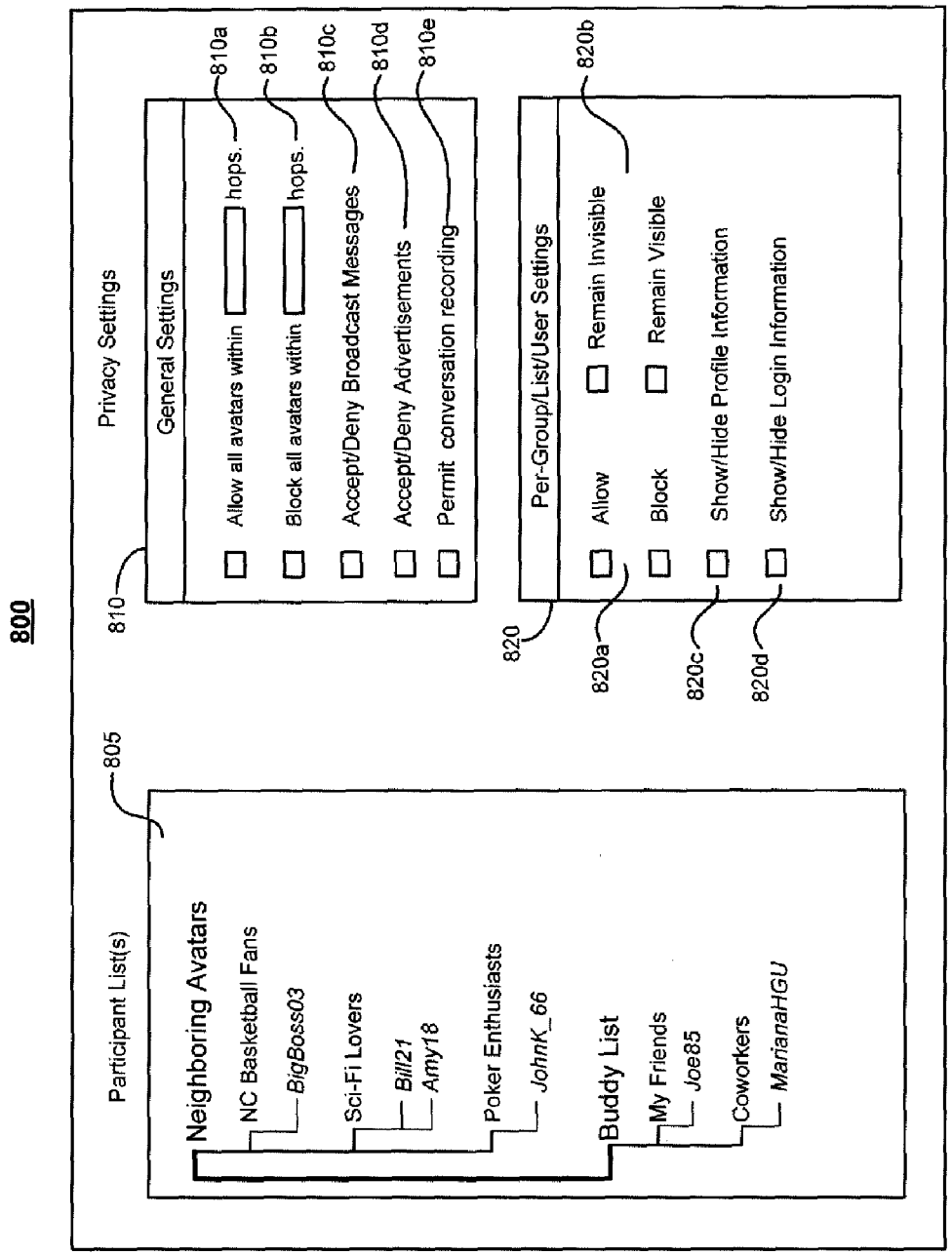

FIG. 8 illustrates a graphical user interface 800 that enables a user to specify privacy preferences in a virtual world environment. The privacy settings may relate to a user's on-line instant messaging settings and/or a user's virtual world environment privacy settings. GUI 800 may be rendered so that a user may interact with the IM or VW servers 115 and 120, using, for example, client systems 105a-105d that are described with respect to FIG. 1. In one implementation, the neighboring avatar selection settings specified through GUI 800 are stored in the IM server 115 or VW server 120 of FIG. 1.

GUI 800 includes a participant list 805 and a general privacy setting window 810. The participant list (or co-user list) 805 includes a list of online identities for other users. The general privacy setting window 810 may be used to specify preferences related to a general behavior of a user's avatar in a virtual world environment. For example, the user may enable communications with neighboring avatars located within the specified N-hop radius of the user's avatar in the virtual world environment (810a). Enabling communications within the specified N-hop radius may enable perception of presence information and/or the exchange of messages from the proximate neighboring avatars, thereby enabling the user to exert a great desire of control.

Alternatively, in a large virtual world environment, a user may preserve a greater desire of privacy and may avoid avatars located further away. For example, a user may block distribution of identification information for avatars located beyond the N-hop radius of the user's avatar in the virtual world environment (810b). The user also may specify preferences with regard to broadcast (810c) or advertisement messages (810c-d). Broadcast messages may include communications intended for all proximate avatars. For example, a neighboring avatar may ask proximate avatars for directions to place X or a recommendation for a nice restaurant, or may broadcast a desire to sell/purchase concert tickets. However, a user may elect to avoid these and other types of broadcast inquiries by blocking broadcast messages via a broadcast message selection box 810c. Similarly, the user may choose to avoid advertising messages from vendors via an advertisement message selection box 810d. While an advertisement may be similar to or sent as broadcast messages, advertisements generally are deemed to originate from commercial organizations. Finally, the user may choose to permit or disallow others to record her conversations via a selection box 810e. For example, the user may permit/disallow conversation recording to all avatars, permit/disallow conversation recording only to specific avatars, or permit/disallow recording to avatars within or outside of a specified radius, such as within 2 hops or 10 units. Recording permissions also may be set based on characteristics of other avatars. Such characteristics were discussed with respect to FIG. 3 and may include, among others, user types, user interests, or social interests. For example, if the user is an avid animal lover, as a matter of personal preference she may disallow conversation recording to all users interested in fur products.

In addition, the user may specify which types of conversations may be recorded. For example, the user may allow recording of the transcription of the conversation, but disallow voice/video recording. In another example, the user may only allow conversations to be recorded in specific locations, such as public places (e.g. town square), and disallow recording in private locations. Finally, the user may require that she is prompted every time her conversation is recorded by someone so that she may choose to allow or disallow conversation recording.

Alternatively or in addition, GUI 800 includes a per group/list/user privacy setting window 820. Privacy setting window 820 enables a user to specify privacy settings for a particular group, list, and/or user. For example, a user may highlight a group in the participant list 805 and specify privacy settings for the highlighted group. The user may allow or block messages arriving from specific groups, lists, or users (820a). In addition, the user may elect to remain visible/invisible (or use a non-descript or one-time identity) to the highlighted group (820b). If the user elects to be invisible, presence is not conveyed to the highlighted group. In addition, the user may elect to show/hide a profile (820c) or login (820d) information from the highlighted groups. When the user elects to hide a profile or login information, other users are not able to view the user's profile or track the user's login/logout times. In yet another implementation, the user may specify that (1) the user's identity should be invisible to a first group of users (e.g., avatars more than a specified distance away), (2) that a nondescript identity should be used for a second group of users (e.g., avatars located more than a first threshold number of "hops" away and less than a second threshold number of "hops" away), and (3) the user will reveal a persistent identity to a third group of users (e.g., selectively reveal a favored screen name to users/avatars located less than the first threshold number of hops away).

Figure 9:
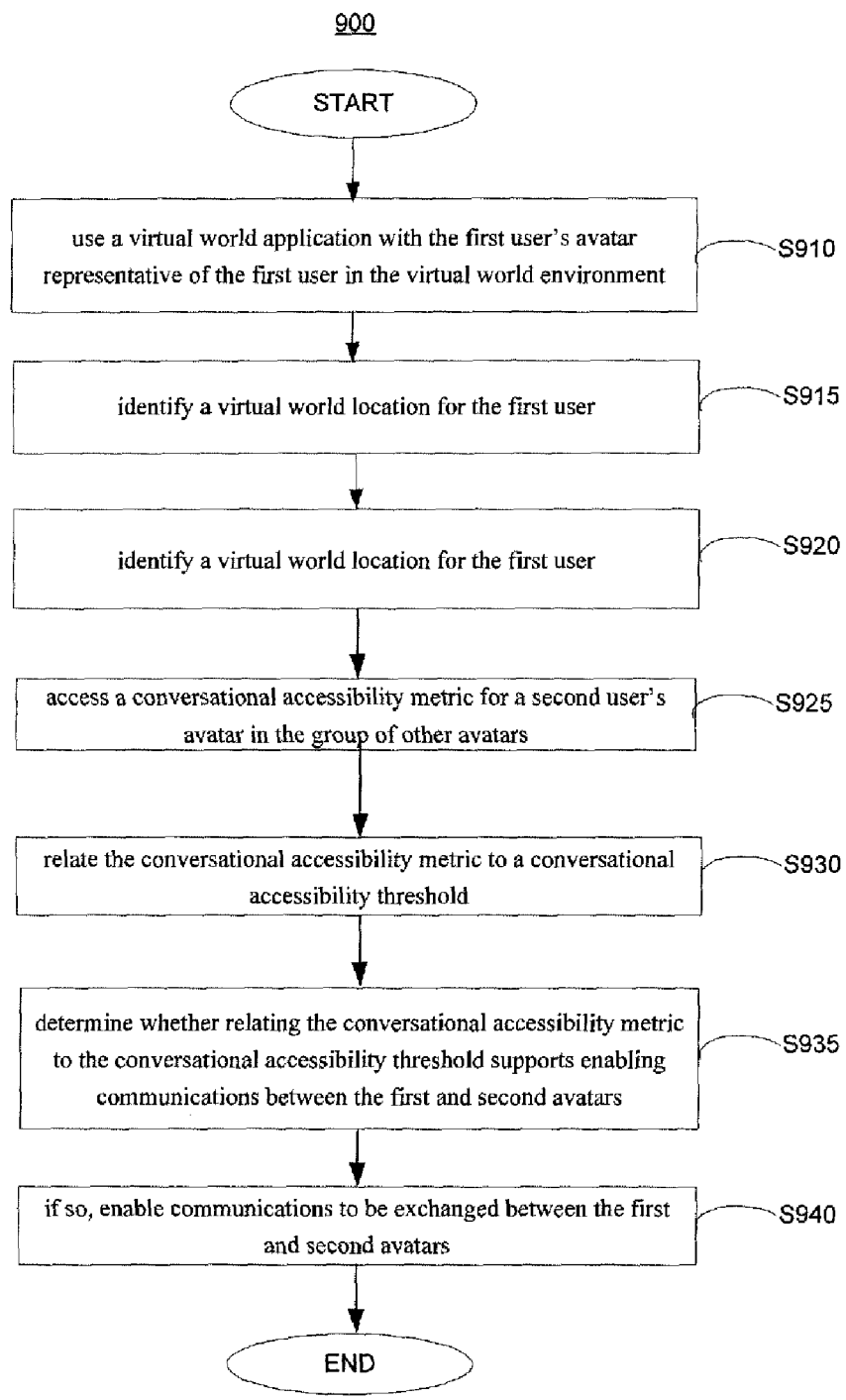
FIG. 9 is a flow chart of an exemplary process by which communications are enabled.

FIG. 9 is a flowchart illustrating an exemplary process 900 for controlling a first user's avatar in a virtual world environment. When the process 900 begins (S905), a virtual world environment application is used with the first user's avatar representative of the first user in the virtual world environment (S910). A virtual world environment location for the first user is identified (S915). For example, a location may be a region, a city, or an area in the virtual world environment. The location may be specified using coordinates (e.g., x, y, z) or as a discovery area using a radius from the specified coordinates.

A group of other avatars proximate to the same virtual world environment location is identified (S920). For example, all avatars within a 3 unit radius of the first user's avatar may be identified as proximate. In another example, a group of avatars positioned at specific virtual location, such as a "Dining Room" may be identified as proximate.

A conversational accessibility metric for a second user's avatar in the group of other avatars is accessed (S925). The conversational accessibility metric may be an aggregate metric. In one implementation, accessing a conversational accessibility metric for the second user's avatar may include accessing information that is based at least in part on the proximity of the second user's avatar to the first user's avatar in the virtual world environment.

In another implementation, accessing a conversational accessibility metric for the second user's avatar also may include accessing information that is based at least in part on characteristics of the second user. The characteristics may include at least one of the second user type, one or more interests of the second user, and a social interest of the second user. For example, it may be determined that the second user is interested in politics and sports, and disinterested in home decoration.

The conversational accessibility metric is related to a conversational accessibility threshold (S930). It is then determined whether relating the conversational accessibility metric to the conversational accessibility threshold supports enabling communications between the first and second avatars (S935).

If relating the conversational accessibility metric to the conversational accessibility threshold supports enabling communications between the first and second avatars, communications to be exchanged between the first and second avatars are enabled (S940). Enabling communications may include enabling text, voice, video or non-verbal communications. For example, the first user may only want to enable voice/video conversations with avatars of other users who are interested in having a discussion on a specific topic, such as sports or politics. Similarly, the first user may choose not to foster communications with avatars of other users who wish to discuss home decoration.

The process 900 also may include rendering a participant list perceivable to the first user. Rendering the avatar list may include identifying avatars, organizing identified avatars into categories based on proximity or user characteristics, and displaying information for identified avatars. Identifying avatars may further include accessing privacy settings for the avatars being identified. The privacy settings may relate to a user's on-line instant messaging settings and/or a user's virtual world environment privacy settings.

In yet another implementation, the process 900 may further include recording conversations between other avatars in the same group while communications are exchanged between the first and second avatars. Additionally, the recorded communications may be replayed after communications between the first and second avatars finish. Therefore, the first user who is not able to engage in multiple conversations at once may choose to listen to the recorded conversations later, once her current conversation is over.

It will be understood that various modifications may be made without departing from spirit and scope of the claims. For example, the operations may be performed in a different order and/or the components in the disclosed systems may be combined in a different manner and/or replaced or supplemented by other components. As an example, the paralinguistic translation server may be located on the IM server, VW server, or client computers. Other implementations are within the scope of the following claims.

The invention claimed is:

1. A method, performed by at least one processor, of controlling a first avatar in a virtual world environment, the method comprising:
   using a virtual world application enabling access to a virtual world environment within which the first user has an avatar associated with the first user;
   identifying, from within the virtual world environment, a virtual world location corresponding to the first avatar;
   identifying at least one second avatar proximate to the virtual world location;
   accessing filtering information;
   accessing profile information related to the second avatar;
   comparing the filtering information to the accessed profile information;
   determining, based on the comparison results, a metric related to the second avatar;
   relating the metric to a threshold;
   determining whether relating the metric to the threshold supports enabling communications between the first and second avatars; and
   if so, enabling communications to be exchanged between the first and second avatars.

2. The method of claim 1 wherein filtering information is based at least in part on the proximity of the second avatar to the first avatar in the virtual world environment.

3. The method of claim 1 wherein filtering information is based at least in part on characteristics of a profile of a user associated with the second avatar.

4. The method of claim 1 wherein filtering information is based at least in part on characteristics of a profile associated with the second avatar.

5. The method of claim 1 wherein filtering information is based at least in part on information specified by the first user.

6. The method of claim 1 wherein profile information at least one of the second user type, one or more interests of the second user, and a social interest of the second user.

7. The method of claim 1 further comprising rendering a participant list perceivable to the first user.

8. The method of claim 7 wherein rendering the participant list includes:
   identifying avatars;
   organizing identified avatars into categories based on proximity or user characteristics; and
   displaying information for identified avatars.

9. The method of claim 8 wherein identifying avatars includes accessing privacy settings for the avatars being identified.

10. The method of claim 1 wherein enabling communications includes enabling text communications.

11. The method of claim 1 wherein enabling communications includes enabling voice/video communications.

12. The method of claim 1 further comprising recording conversations between other avatars in the same group while communications are exchanged between the first and second avatars.

13. The method of claim 12 further comprising replaying recorded communications after communications between the first and second avatars finish.

14. The method of claim 1 wherein the metric is an aggregate metric comprising
   at least one sub-category with an assigned weight.

15. A system for controlling a first avatar in a virtual world environment, the system comprising:
   at least one processor;
   means for using a virtual world application enabling access to a virtual world environment within which the first user has an avatar associated with the first user;
   means for identifying, from within the virtual world environment, a virtual world location corresponding to the first avatar;
   means for identifying at least one second avatar proximate to the virtual world location;
   means for accessing filtering information;
   means for accessing profile information related to the second avatar;
   means for comparing the filtering information to the accessed profile
   means for determining, based on the comparison results, a metric related to the second avatar;
   means for relating the metric to a threshold;
   means for determining whether relating the metric to the threshold supports enabling communications between the first and second avatars; and
   means for enabling communications to be exchanged between the first and second avatars if it is determined that relating the metric to the threshold supports enabling communications between the first and second avatars.

16. The system of claim 15 wherein filtering information is based at least in part on the proximity of the second avatar to the first avatar in the virtual world environment.

17. The system of claim 15 wherein filtering information is based at least in part on characteristics of a profile of a user associated with the second avatar.

18. The system of claim 15 wherein filtering information is based at least in part on characteristics of a profile associated with the second avatar.

19. The system of claim 15 wherein filtering information is based at least in part on information specified by the first user.

20. The system of claim 15 wherein profile information at least one of the second user type, one or more interests of the second user, and a social interest of the second user.

21. The system of claim 15 further comprising means for rendering a participant list perceivable to the first user.

22. The system of claim 21 wherein means for rendering the participant list include means for:
   identifying avatars;
   organizing identified avatars into categories based on proximity or user characteristics; and
   displaying information for identified avatars.

23. The system of claim 22 wherein means for identifying avatars include means for accessing privacy settings for the avatars being identified.

24. The system of claim 15 wherein means for enabling communications include means for enabling text communications.

25. The system of claim 15 wherein means for enabling communications include means for enabling voice/video communications.

26. The system of claim 15 further comprising means for recording conversations between other avatars in the same group while communications are exchanged between the first and second avatars.

27. The system of claim 26 further comprising means for replaying recorded communications after communications between the first and second avatars finish.

28. The system of claim 15 wherein the metric is an aggregate metric comprising at least one sub-category with an assigned weight.

29. A computer program stored in a computer non-transitory storage medium, the computer program comprising instructions that when executed on at least one processor cause the program to:
   use a virtual world application enabling access to a virtual world environment Within which the first user has an avatar associated with the first user;
   identify, from within the virtual world environment, a virtual world location corresponding to the first avatar;
   identify at least one second avatar proximate to the virtual world location;
   access filtering information;
   access profile information related to the second avatar;
   compare the filtering information to the accessed profile information;
   determine, based on the comparison results, a metric related to the second avatar;
   relating the metric to a threshold;
   determining whether relating the metric to the threshold supports enabling communications between the first and second avatars; and
   if so, enabling communications to be exchanged between the first and second avatars.

30. The computer program of claim 29 wherein filtering information is based at least in part on the proximity of the second avatar to the first avatar in the virtual world environment.

31. The computer program of claim 29 wherein filtering information is based at least in part on characteristics of a profile of a user associated with the second avatar.

32. The computer program of claim 29 wherein filtering information is based at least in part on characteristics of a profile associated with the second avatar.

33. The computer program of claim 29 wherein filtering information is based at least in part on information specified by the first user.

34. The computer program of claim 29 wherein profile information at least one of the second user type, one or more interests of the second user, and asocial interest of the second user.

35. The computer program of claim 29 further comprising instructions for causing the program to render a participant list perceivable to the first user.

36. The computer program of claim 35 wherein instructions for causing the program to render the participant list include instructions for causing the program to:
   identify avatars;
   organize identified avatars into categories based on proximity or user characteristics; and
   display information for identified avatars.

37. The computer program of claim 36 wherein instructions for causing the program to identify avatars include instructions for causing the program to access privacy settings for the avatars being identified.

38. The computer program of claim 29 wherein enabling communications includes enabling text communications.

39. The computer program of claim 29 wherein instructions for causing the program to enable communications include instructions for causing the program to enable voice/video communications.

40. The computer program of claim 29 further comprising instructions for causing the program to record conversations between other avatars in the same group while communications are exchanged between the first and second avatars.

41. The computer program of claim 40 further comprising instructions for causing the program to replay recorded communications after communications between the first and second avatars finish.

42. The computer program of claim 29 wherein the metric is an aggregate metric comprising at least one sub-category with an assigned weight.

* * * * *

UNITED STATES PATENT AND TRADEMARK OFFICE
CERTIFICATE OF CORRECTION

| | | |
|---|---|---|
| PATENT NO. | : 8,026,918 B1 | Page 1 of 1 |
| APPLICATION NO. | : 11/944365 | |
| DATED | : September 27, 2011 | |
| INVENTOR(S) | : Stephen Vaughan Murphy | |

It is certified that error appears in the above-identified patent and that said Letters Patent is hereby corrected as shown below:

Claim 29, col. 17, line 48, "Within" should read -- within --.

Claim 34, col. 18, line 24, "asocial" should read -- a social --.

Signed and Sealed this
Tenth Day of January, 2012

David J. Kappos
*Director of the United States Patent and Trademark Office*